United States Patent
Browne et al.

(10) Patent No.: US 7,299,630 B2
(45) Date of Patent: Nov. 27, 2007

(54) POSITIONING AND LOCKING MECHANISMS AND ARTICLES THAT EMPLOY THE SAME

(75) Inventors: Alan L. Browne, Grosse Pointe, MI (US); Paul R. Meernik, Redford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 275 days.

(21) Appl. No.: 11/077,500

(22) Filed: Mar. 9, 2005

(65) Prior Publication Data

US 2005/0210874 A1 Sep. 29, 2005

Related U.S. Application Data

(60) Provisional application No. 60/552,878, filed on Mar. 12, 2004.

(51) Int. Cl.
*F01B 29/10* (2006.01)
(52) U.S. Cl. .......................... 60/527; 60/528
(58) Field of Classification Search ............ 60/527, 60/528; 92/1
See application file for complete search history.

(56) References Cited

U.S. PATENT DOCUMENTS

| | | | |
|---|---|---|---|
| 2,394,488 A * | 2/1946 | Rotter et al. ............... 222/340 |
| 3,758,092 A | 9/1973 | McGregor | |
| 4,097,080 A | 6/1978 | Petry | |
| 4,830,417 A | 5/1989 | Bates et al. | |
| 4,934,749 A | 6/1990 | Folarin | |
| 4,955,196 A * | 9/1990 | Lin et al. ...................... 60/527 |
| 4,958,711 A * | 9/1990 | Okubo et al. ................. 192/60 |
| 4,988,081 A | 1/1991 | Dohrmann | |
| 5,024,309 A * | 6/1991 | Takemura et al. ............ 192/60 |
| 5,370,429 A | 12/1994 | Reuber et al. | |
| 5,593,195 A | 1/1997 | Lei | |
| 5,967,573 A | 10/1999 | Wang | |
| 6,174,008 B1 | 1/2001 | Kramer et al. | |
| 6,302,458 B1 | 10/2001 | Wang et al. | |
| 6,401,565 B1 | 6/2002 | Wang et al. | |
| 6,536,818 B1 | 3/2003 | Moss | |
| 2002/0050723 A1 | 5/2002 | Wang et al. | |

* cited by examiner

*Primary Examiner*—Hoang Nguyen (57) ABSTRACT

Disclosed herein is a locking mechanism for positioning or locking an article comprising a housing 3; an optional active element 6 in operative communication with a connecting means 22, wherein the active element 6 and the connecting means 22 are disposed within the housing 3; wherein the active element 6 upon being activated is capable of exerting a force on the connecting means 22; a compression initiation element 4 located within the housing 3, wherein the compression initiation element 4 comprises a shape memory material, and wherein the compression initiation element 4 upon activation facilitates the activation of the active element 6; and a spring stack 8 disposed adjacent to the compression initiation element 4, wherein the spring stack 8 is in operative communication with the compression initiation element 4 and wherein the spring stack 8 is configured to radially expand within the housing 3.

19 Claims, 6 Drawing Sheets

POSITIONING AND LOCKING MECHANISMS AND ARTICLES THAT EMPLOY THE SAME

CROSS REFERENCE TO RELATED APPLICATIONS

This application claims the benefit of U.S. Provisional Application Ser. No. 60/552,878 filed Mar. 12, 2004, the entire contents of which are hereby incorporated by reference.

BACKGROUND

This disclosure relates to a positioning and locking mechanism and articles that utilize these mechanisms.

Numerous devices use linear actuators for purposes of positioning articles such as entrances (doors) in automobiles and residential buildings, jaws of power tools, platens in manufacturing devices such as injection molding machines, compression molding machines, band saws, or the like. Actuators commonly use a combination of pneumatic and electrical devices to achieve such positioning. However, the use of pneumatic and electrical actuators are expensive and occupy an extensive amount of space. It is therefore desirable to use actuators for positioning that are compact, consume less power, are easily controllable and can provide accuracy and sensitivity to the device.

SUMMARY

Disclosed herein is a locking mechanism for positioning or locking an article comprising a housing; an active element in operative communication with a connecting means, wherein the active element and the connecting means are located in the housing; wherein the active element upon being activated is capable of exerting a force on the connecting means; a compression initiation element located within the housing, wherein the compression initiation element comprises a shape memory material, and wherein the compression initiation element upon activation facilitates the activation of the active element; and a spring stack disposed adjacent to the compression initiation element, wherein the spring stack is in operative communication with the compression initiation element and wherein the spring stack is configured to radially expand within the housing.

Disclosed herein too is a locking mechanism for positioning or locking an article comprising a housing; an active element in operative communication with a connecting means, wherein the active element upon being activated is capable of exerting a force on the connecting means, and wherein the connecting means is in slideable communication with the housing and wherein the connecting means is in operative communication with a reference frame and the article; a spring stack and a compression initiation element that act as a restraint upon the active element, wherein the compression initiation element upon activation facilitates the activation of the active element, and wherein the spring stack is in operative communication with the connecting means and with the compression initiation element; wherein the housing houses the active element, the compression initiation element and the spring stack.

Disclosed herein too is a method for operating a locking mechanism comprising activating a compression initiation element that comprises a shape memory material by the application of an external stimulus; decompressing a spring stack, wherein the spring stack comprises one or more springs; activating an active element in a manner effective to displace a connecting means disposed between an article and a reference frame, wherein the compression initiation element, the spring stack and the connecting means are all disposed within a housing.

DESCRIPTION OF FIGURES

Referring now to the figures, which are exemplary embodiments, and wherein like elements are numbered alike.

DETAILED DESCRIPTION

Disclosed herein is a wave spring locking mechanism that enables the positioning and/or locking or an article with respect to a reference frame. The article may be any device that utilizes spatial positioning such as a door in an automobile or a residential building; the hood or trunk of a automobile; the jaws of a vice or a press; the platens on machine tools such as injection molding machines, compression molding machines; arbors and chucks on lathes and drilling machines, or the like. The reference frame can comprise a door frame, an automobile frame, a aircraft frame, a ship frame, or the like, to which the movable article is in communication with. While the position of the reference frame is generally fixed, in certain situations, both the article and the reference frame are mobile and can be displaced.

In one embodiment, the positioning or repositioning of an article that is in operative communication with the locking mechanism is accomplished by the application of a suitable manual force. In another embodiment, the positioning or repositioning of an article that is in operative communication with the locking mechanism is accomplished by use of a motive force such as mechanical energy or electrical energy. Positioning or repositioning is defined as the motion imparted to the article by manual force or other motive forces such as mechanical energy, electrical energy, or the like. The ability to position and lock an article in a state of equilibrium at any desirable point along the length of its travel is termed detent. The locking mechanisms described below have an infinite detent capability and permit positioning or repositioning of the article at any degree of opening with the minimal use of force.

In one embodiment, the locking mechanism is a wave spring mechanism. The wave spring locking mechanism is advantageous in that it permits positioning at any height or degree of opening depending upon the physical characteristics of the person opening the article. The detent capability exhibited by the wave spring locking mechanism may be advantageously employed in automobile lift gates, tail gates, doors, hoods, trunks, or the like. They may also be advantageously employed in windows and doors for aircraft, ships, residential and office buildings. The wave spring locking mechanism may be advantageously employed in storm doors for residential and office buildings.

Figure 1:
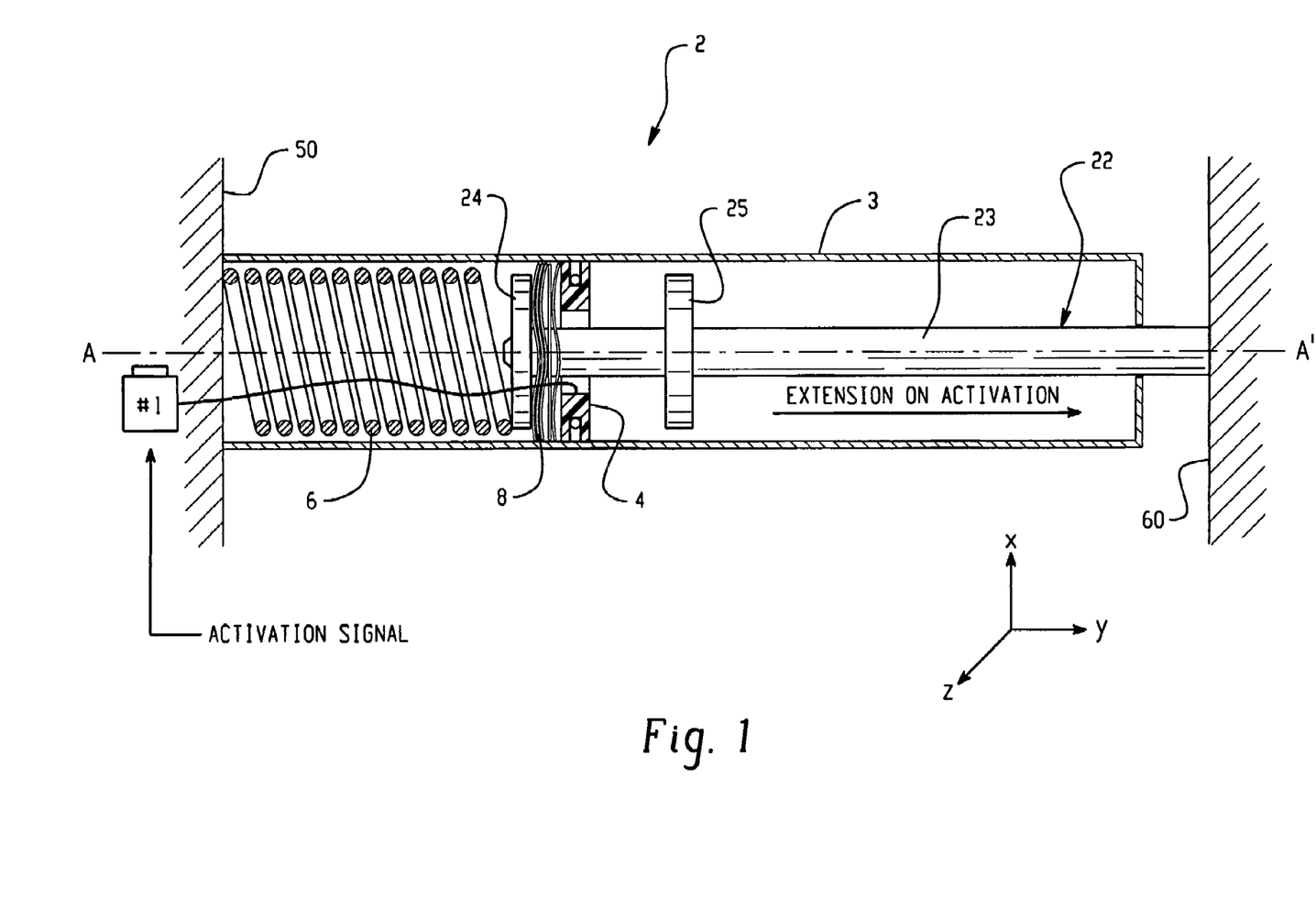
FIG. 1 is a depiction of one exemplary embodiment of a locking mechanism 2, wherein a smart material, preferably a shape memory alloy is used to activate the positioning of an article 60.

Referring now to an exemplary embodiment depicted in the FIG. 1, the locking mechanism 2 comprises a housing 3 in which is disposed a compression initiation element 4, an optional active element 6, a spring stack 8 and a connecting means 22. The active element 6 is optional and its exclusion from the locking mechanism 2 would permit the user to manually control the displacement of the locking mechanism 2. The locking mechanism 2 is disposed between a reference frame 50 and the article 60 whose position is to be controlled. The connecting means 22 is in operative communication with the reference frame 50 and/or the article 60. In one embodiment, the compression initiation element 4, the active element 6 and the spring stack 8 act cooperatively to facilitate the positioning and locking of the article 60.

The housing 3 is of a length effective to permit the article 60 to accomplish its entire range of desired motion. The housing 3 may be manufactured from a metal, a ceramic, a polymer, or a combination comprising at least one of the foregoing. The housing 3 may also be manufactured from a composite such as, for example, a graphitic composite. The inner wall of the housing 3 may be optionally coated with a coating such as polytetrafluoroethylene that reduces friction. The housing 3 may have any desired cross-sectional shape such as circular, square, triangular or the like. In an exemplary embodiment, the housing 3 has a circular cross-section.

The connecting means 22 is in slideable communication with the housing 3 and comprises a shaft 23 upon which are affixed two cylindrical discs, a first disc 24 and a second disc 25. The first cylindrical disc 24 and the second cylindrical disc 25 are disposed upon on the shaft 23 at a distance apart from each other. Disposed between the first cylindrical disc 24 and the second cylindrical disc 25 are the compression initiation element 4 and the spring stack 8. The active element 6 is generally disposed on the side of the connecting means 22 that is closer to the reference frame 50. The active element 6 is in operative communication with the connecting means 22 and imparts displacement to the connecting means 22 upon activation of the compression initiation element 4. In one embodiment, the longitudinal axis of the compression initiation element 4, the active element 6, the spring stack 8 and/or the connecting means 22 are coincident with the longitudinal axis of the housing 3. The longitudinal axis of the housing 3 is depicted by the line AA' and is parallel to the y-axis indicated in the FIG. 1. In one embodiment, the connecting means 22 is in slideable communication with the housing 3 and reciprocates in a manner such that its longitudinal axis is coincident with the line AA'. In another embodiment, the connecting means 22 reciprocates in a manner such that its longitudinal axis is parallel with the line AA'. For purposes of this disclosure, displacement or movement along the line AA' is termed axial movement and frictional forces that act in a direction that is parallel to the line AA' is termed axial friction.

The compression initiation element 4 comprises a smart material of the class that can undergo a change in shape and/or stiffness upon activation. Activation refers to the application of an external stimulus when the element that is activated comprises a smart material. The compression initiation element, by itself, is not designed to restrain a spring or lock the linear actuator against applied loads. Its purpose is to provide a small axial load against which some of the springs in the spring stack can be loaded, thereby generating a greater axial restraining load against which more springs may be compressed if needed.

Therefore, the compression initiation element 4 in the un-activated state facilitates the compression of the spring stack 8, which facilitates the locking of the article 60. Upon being activated, the compression initiation element 4 facilitates a reduction of compressive forces on the spring stack 8, thereby permitting activation of the active element 6, which facilitates the displacement of the connecting means 22 and hence the movement of the article 60. Details of the compression initiation elements 4 are shown in the FIGS. 2 and 3 and are explained below.

Figure 2:
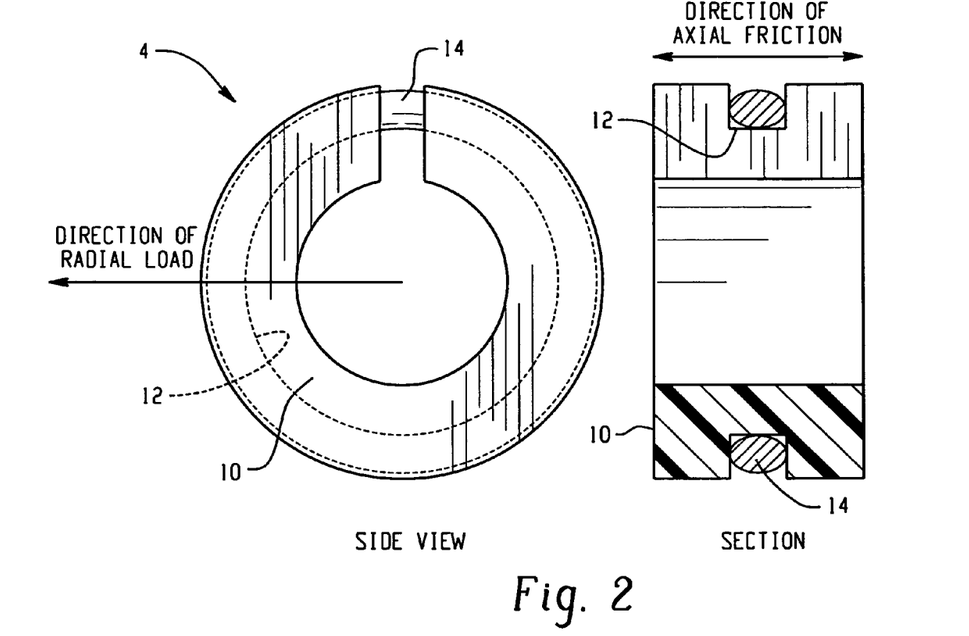
FIG. 2 depicts one exemplary embodiment of a compression initiation element 4.

FIG. 2 is one exemplary depiction of the side view and front view of one embodiment of the compression initiation element 4. In this embodiment, the compression initiation element 4 comprises a split ring 10 that comprises a circumferential slot 12 into which is disposed a ring 14. Both the split ring 10 and the ring 14 can be manufactured from smart materials. In one embodiment, the smart materials used in the locking mechanism 2 are shape memory materials. Shape memory materials generally refer to materials or compositions that have the ability to remember their original shape, which can subsequently be recalled by applying an external stimulus, i.e., an activation signal. As such, deformation of the shape memory material from the original shape can be a temporary condition, which can be used for fixturing a variety of workpieces having different surface contours. Exemplary shape memory materials suitable for use in the present disclosure include shape memory alloys and ferromagnetic shape memory alloys and composites of the foregoing shape memory materials with non-shape memory materials, and combinations comprising at least one of the foregoing shape memory materials. In another embodiment, the class of smart materials used in the locking mechanism 2 are those that change their shape in proportion to the strength of the applied field but then return to their original shape upon the discontinuation of the field. Exemplary smart materials in this category are shape memory alloys, electroactive polymers (dielectric polymers), piezoelectrics, and piezoceramics.

For convenience and by way of example, reference herein will be made to shape memory alloys. An exemplary smart material for the ring 14 is a shape memory alloy.

The unconstrained outer diameter of the split ring 10 is selected to be slightly greater than the inner diameter of the housing 3. The split ring 10 is compressed and inserted into the housing 3, in a manner similar to a piston ring that is compressed and inserted into a cylindrical bore. When the diameter of the split ring 10 is unconstrained, the split ring 10 exerts a radial force against the inner surface of the housing 3, such that the resulting axial friction is sufficient to cause the spring stack 8 to lock and thereby restraining the active element 6. As noted above the split ring 10 can be manufactured from a smart material.

As detailed above, the ring 14 is disposed in the circumferential slot 12 of the compression initiation element 4. The ring 14 can comprise one or more turns of SMA wire. The force desirable to compress the split ring 10 and to reduce the axial friction between the split ring 10 against the inner surface of the housing 3 could be used to determine the number of turns of the SMA wire used to form the ring 14. Alternatively, the ring 14 can comprise a solid band manufactured from an SMA. The solid can have a circular cross-section, a rectangular cross-section, or the like.

Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their flexural modulus (stiffness), yield strength, and shape orientation are altered as a function of temperature. Generally, in the low temperature, or martensite phase, shape memory alloys can be plastically deformed and upon exposure to some higher temperature will transform to an austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating.

Intrinsic and extrinsic two-way shape memory alloys are characterized by a shape transition both upon heating from the martensite phase to the austenite phase, as well as an additional shape transition upon cooling from the austenite phase back to the martensite phase. Active elements that exhibit an intrinsic one-way shape memory effect are fabricated from a shape memory alloy composition that will cause the active elements to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active connector elements that exhibit the extrinsic two-way shape memory effects are composite or multi-component materials that combine a shape memory alloy composition that exhibits a one-way effect with another element that provides a restoring force to return the first plate another position or to its original position.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the alloy composition.

Suitable shape memory alloy materials for fabricating the active elements include nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, or the like, or a combination comprising at least one of the foregoing shape memory alloys. The alloys can be binary, ternary, or any higher order so long as the alloy composition exhibits a shape memory effect, e.g., change in shape orientation, changes in yield strength, and/or flexural modulus properties, damping capacity, and the like.

The thermal activation signal may be applied to the shape memory alloy in various ways. It is generally desirable for the thermal activation signal to promote a change in the temperature of the shape memory alloy to a temperature greater than or equal to its austenitic transition temperature. Suitable examples of such thermal activation signals that can promote a change in temperature are the use of steam, hot oil, resistive electrical heating, or the like, or a combination comprising at least one of the foregoing signals. A preferred thermal activation signal is one derived from resistive electrical heating.

Referring once again to the FIG. 2, when the ring 14 is activated by raising its temperature above its transition temperature, the ring changes its original shape and takes on a preset shape that has a smaller diameter than the original shape. The change to a smaller diameter results in the compression of the split ring 10. The compression of the split ring 10 results in the removal of the radial load imposed by the split ring 10 on the housing 3.

If the ring 14 is manufactured from a two way shape memory alloy, the split ring 10 can be returned to its original shape upon cooling the ring 14 to its original temperature. Alternatively, the split ring 10 can be returned to its original shape by heating the ring 14 to a second transformation temperature.

Figure 3:
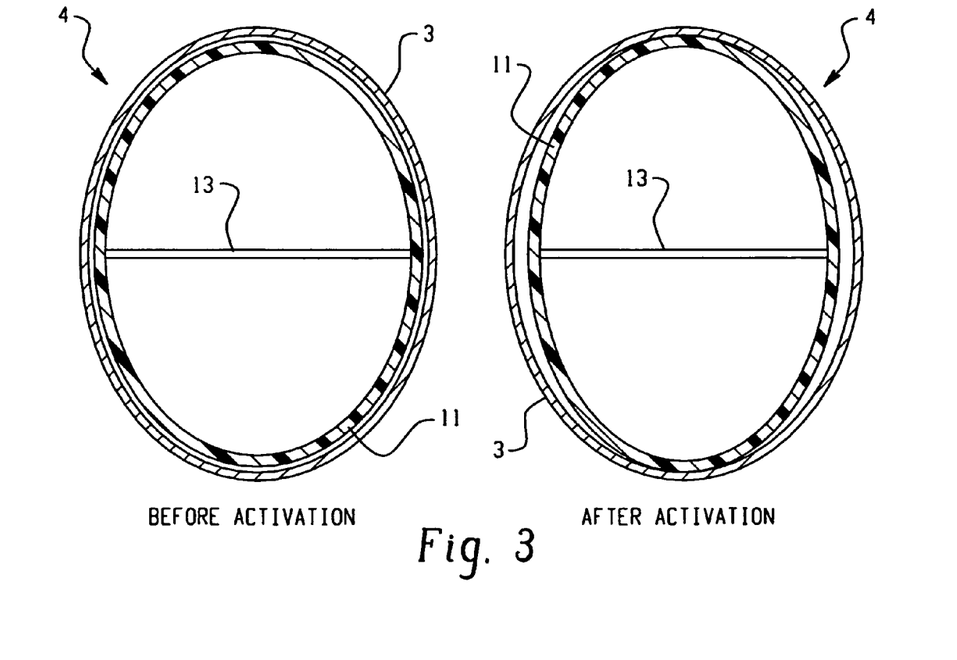
FIG. 3 depicts another exemplary embodiment of a compression initiation element 4.

Another embodiment of a compression initiation element 4 is shown in the FIG. 3. While the split ring compression initiation element 4 depicted in FIG. 2 provides friction in its original state during which the ring 14 is not activated, the compression initiation element 4 can also be designed to provide axial friction only after a stimulus is applied to activate the compression initiation element 4. This is depicted in the FIG. 3. In this embodiment, the compression initiation element 4 comprises a circular hoop element 11, with a cross-member 13 manufactured from a smart material that can contract upon activation. The circular hoop element 11 floats freely in the housing 3. The cross-member can be a wire. When the cross-member is activated (e.g., by the application of heat) it contracts and deforms the circular hoop element 11. The circular hoop element 11 upon deformation contacts the inner surface of the housing 3, increasing the axial friction.

The circular hoop element 11 can also be made from smart materials if desired. Suitable smart materials are shape memory alloys.

With reference again to the FIG. 1, the optional active element 6 comprises an expansion spring that is normally under compression. When the optional active element 6 is excluded from the locking mechanism 2, manual control can be exerted over the displacement of the article 60 along its entire range of travel after activation of the compression initiation element 4. Additional springs can be used in the active element 6 if desired. As will be shown in subsequent embodiments, some of these springs can be retracting springs. The expanding and retracting springs are generally coil springs. The expansion spring facilitates the positioning of the article 60 when the constraining forces upon it are removed. The expansion spring has a spring constant effective to displace the article 60 once the constraining force on the split ring 10 is removed. The expansion spring generally expands and contracts along the axis AA'.

The spring stack 8 comprises one or more springs that are capable of expanding radially upon being compressed and provides axial friction between the outer circumferential edge of the individual springs and the inner surface of the housing 3. The axial friction between the outer circumferential edge of the individual wave springs and the inner wall of the housing 3 provides the restraining force necessary to hold active element 6 in its compressed or expanded state until an activation signal causes the split ring to contract.

In one embodiment, the spring stack 8 comprises wave springs. The wave spring stack comprises one or more wave springs and facilitates the locking of the article 60 when the compression initiation element 4 contacts the inner surface of the housing 3. When the wave spring stack comprises more than one wave springs, a washer may be disposed between the wave springs thereby separating some of the wave springs from the others. As can be seen in the FIG. 1, in one embodiment, it is generally desirable to dispose one wave spring between the compression initiation element 4 and the washer, with multiple wave springs disposed between the connecting means 22 and the washer.

Figure 4:
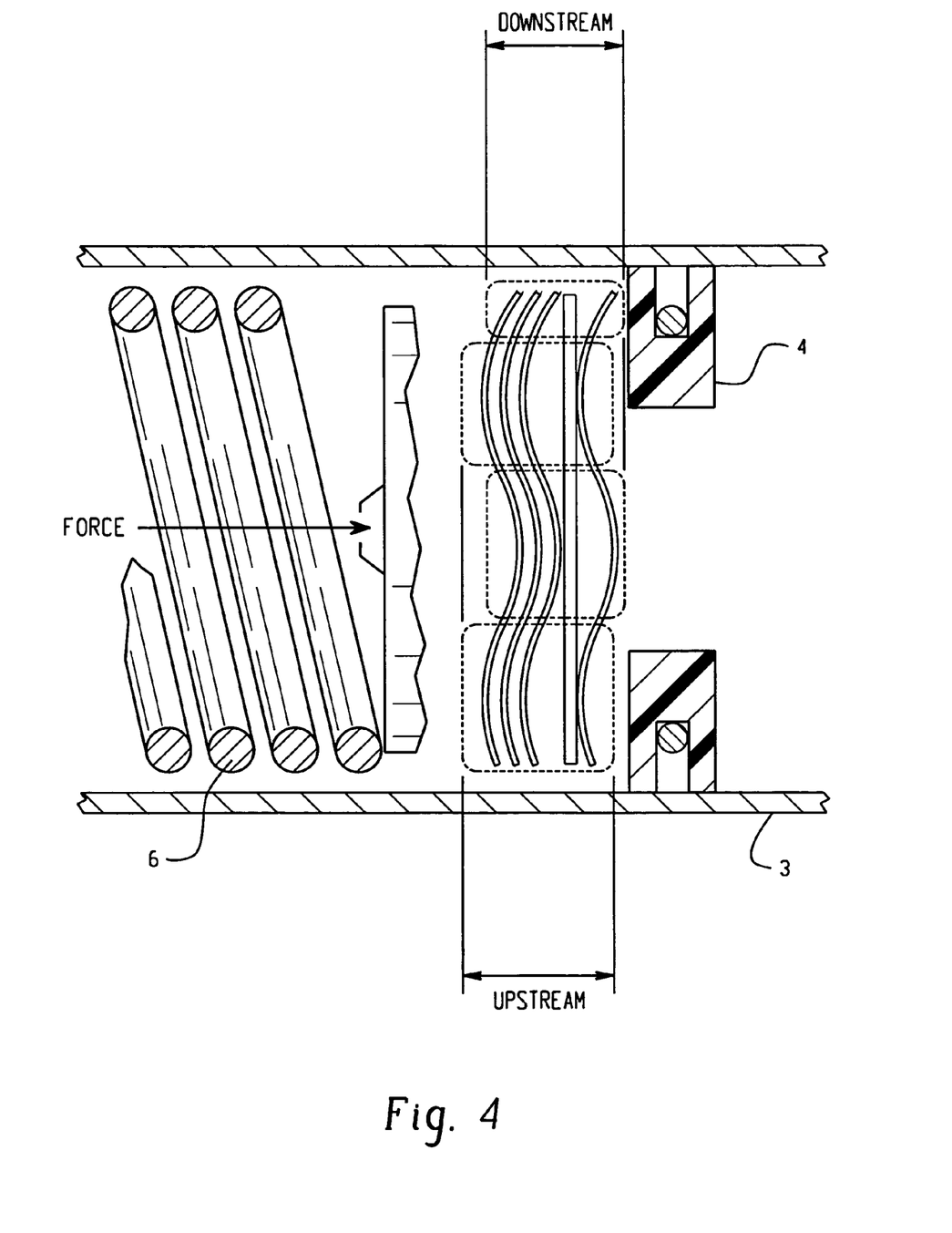
FIG. 4 is a depiction of the terms upstream and downstream as they apply to the disclosed locking mechanisms.

When a compressive force is applied to the wave spring stack, the individual wave springs expand radially outwards and exert a radial load or force against the inner walls of the housing 3, thus facilitating the locking of the article 60. In one embodiment, in order to facilitate the unlocking of the wave spring stack 8, the wave spring stack is designed such that radial contact between the wave springs and the inner wall of the housing 3 occurs only on the upstream portion of the wave spring relative to the compressive initiation element 4. This upstream position of the wave spring stack is shown in the FIG. 4 and refers to that position on the stack that is closer to the reference frame 50 than the article 60. The unlocking of the wave-spring stack can be accomplished by activating the compression initiation element 4 and thereby removing the axial restraining load on the spring stack 8. The downstream portions of the wave spring are then be free to move axially, thus relaxing the radial and the frictional loads between the wave springs and the inner wall of the housing 3.

In one embodiment, in one manner of operating the locking mechanism 2, when it is desired to change the position of the article 60 from a first position to a second position, the temperature of the ring 14 is increased using electrical resistive heating, i.e., the ring 14 is activated. Upon heating the ring 14 above its transition temperature, the SMA wire applies a compressive force on the split ring 10, which causes it to contract radially. The radial contraction of the split ring 10 removes the radial load exerted on the housing 3 and reduces the axial friction between the housing 3 and the compression initiation element 4 as well as the axial friction between the housing 3 and the spring stack 8. The radial contraction of the split ring 10 facilitates the decompression of the springs in the spring stack 8, thereby reducing axial friction between the housing 3 and the spring stack 8. The reduction in the axial friction permits the activation of the expansion spring, thereby facilitating the movement of the article 60 from its first position to its second position. The direction of movement of the article 60 during its displacement from its first position to the second position is shown in the FIG. 1. The term "activation" as used herein refers to the selective application of an external stimulus to the smart material (shape memory material). It also applies to the removal of a constraint on the active element 6 thereby permitting displacement of the active element 6 by virtue of the energy stored therein.

The locking mechanism 2 can facilitate the locking of the article 60 in the second position in several ways. For example, in one embodiment, when split ring 10 is manufactured from an elastic material of sufficient stiffness, it will expand and apply a radial load against housing 3 after ring 14 cools below its transition temperature. The elastic material may be a material that is not a smart material, i.e., it does not require an external stimulus to return to its original shape. Any subsequent attempt to further extend connecting means 22 would then cause the spring stack 8 to lock when loaded against the compression initiation element 4.

The article 60 in the FIG. 1 can be returned to its first position manually if desired. In order to return the article 60 to its first position, the manual force must be greater than the sum of the spring constant of the expansion spring as well as the axial frictional force between the compression initiation element 4 and the inner surface of the housing 3.

The exemplary embodiment depicted in the FIG. 1 can be varied to produce locking mechanisms that are capable of reversible positioning of the article 60. In this embodiment, the active element 6 comprises two springs, one capable of expanding and the other capable of retracting. Upon activation of the expanding spring, the article 60 moves away from the reference frame 50, while upon activation of the retracting spring, the article 60 moves towards the reference frame 50. When the article 60 moves towards the reference frame 50, the locking mechanism 2 permits it to retain its position against compressive forces.

Figure 5:
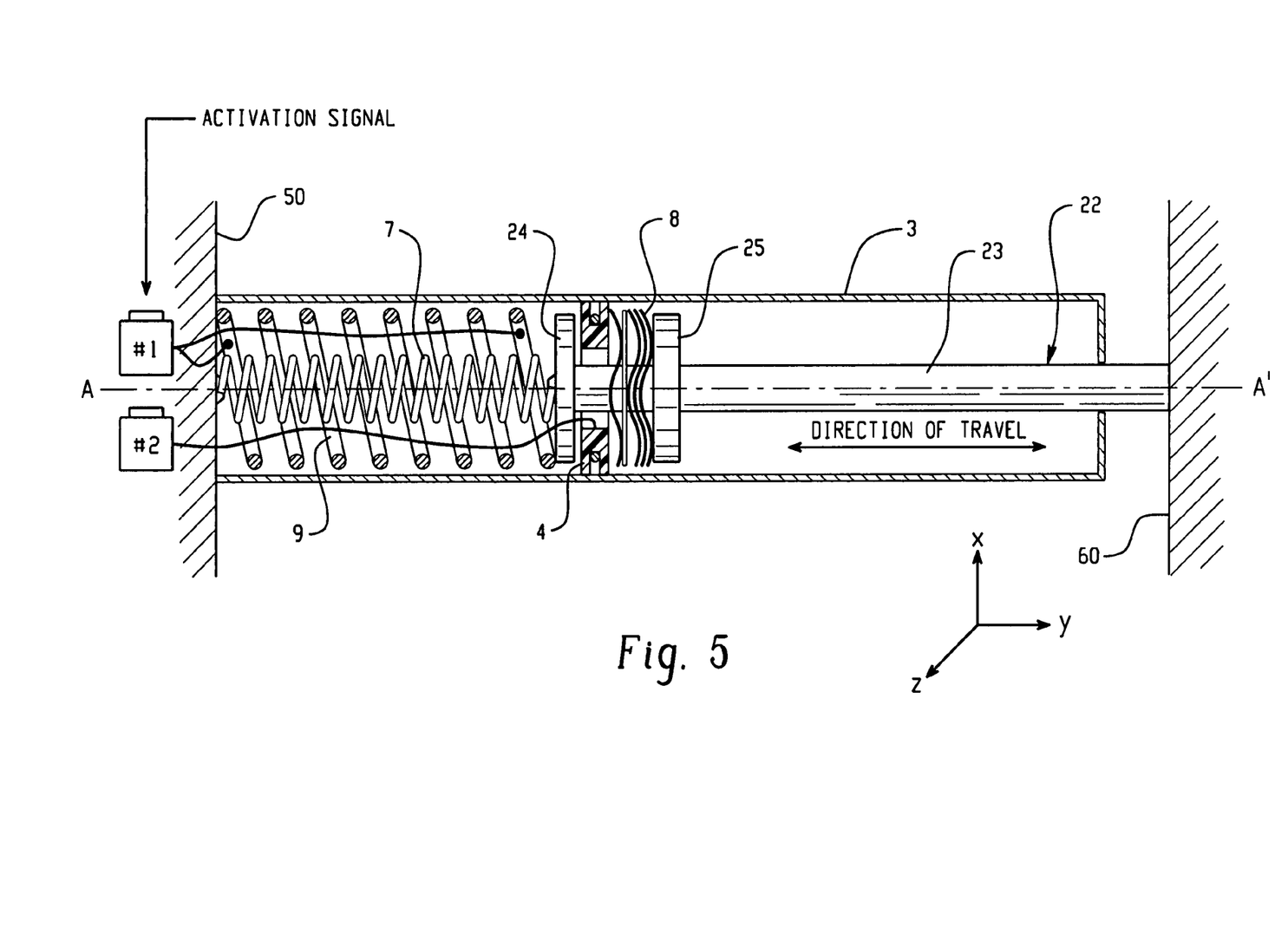
FIG. 5 is a depiction of one exemplary embodiment of a locking mechanism 2 that can be used to resist compressive forces on the locking mechanism 2.

This exemplary embodiment facilitating the reversible positioning of the article 60 is depicted in the FIG. 5. In this embodiment, the active element 6 comprises a first spring 7 and a second spring 9. Either the first spring 7 or the second spring 9 is manufactured from a smart material. When the first spring 7 is manufactured from a smart material, the second spring 9 is manufactured from a material that does not have memory retention capabilities or vice-versa. In one embodiment, when the first spring 7 is a retracting spring, the second spring 9 is an expansion spring. In another embodiment, when the first spring 7 is an expansion spring, the second spring 9 is a retracting spring.

As depicted in the FIG. 5, the compression initiation element 4 and the spring stack 8 are located between the first disc 24 and the second disc 25. The compression initiation element 4 is constructed of the same materials and behaves in the same manner as detailed above in the description of the FIG. 1. The spring stack 8 is located on the article (60) side of the compression initiation element 4. The spring stack advantageously comprises wave springs and behaves in a manner similar to that described above in the description of the FIG. 1.

In the exemplary depiction of FIG. 5, the retraction spring 7 is manufactured from a material that does not display memory retention properties. In other words, the retraction spring 7 is not manufactured from a smart material. When the retraction spring 7 is activated it displaces the connecting means 22 towards the reference frame 50. The expansion spring 9 is made from a smart material such as, for example, a shape memory alloy. When the expansion spring 9 is activated by the application of external stimuli it has a spring constant $k_2$ that is greater than the spring constant $k_1$ of the retraction spring. Because of its greater spring constant, the expansion spring can promote displacement of the connecting means 22 towards the article 60.

In one embodiment, in one manner of operating the locking mechanism 2 depicted in the FIG. 5, when it is desired to change the position of the article 60 from a first position to a second position an activating stimulus is supplied to the spring 9. The activating stimulus is preferably a change in temperature brought on by resistive heating. Upon heating the expansion spring 9 above its transition temperature, the expansion spring promotes displacement of the connecting means 22 towards the article 60. The lightly loaded compression initiation element 4 and the unloaded spring stack 8 will be pushed along by disk 24. Thus the displacement of the expansion spring 9 promotes movement of the article 60 towards its second position from the first position.

When the article 60 reaches the desired second position, the activating stimulus is removed from the expansion spring 9. Any loading of shaft 23 in the direction of element 50 will cause the compression of the springs in the spring stack 8 between the compression initiation element 4 and the disc 25. This compression promotes the radial expansion of the springs in the spring stack 8. The radial expansion of the springs in the spring stack 8 promotes contact between the springs and the inner surface of housing 3 and increases the axial friction between the springs and the housing 3. The increase in the axial friction permits the locking of the article 60 in the desired second position. Thus, the embodiment depicted in the FIG. 5 can be advantageously used to resist compressive loads.

In one embodiment, if the ring 14 is manufactured from a two way shape memory alloy, the ring upon cooling returns to its original shape and provides additional axial friction to assist with the locking in the second position.

When the article 60 is to be returned to the first position, the ring 14 is activated, thus unloading the spring stack 8. The expansion spring 9 is not however activated during the desired return. The compressive forces of the retraction spring 7 overcome the extensional forces exerted by the expansion spring 9, thereby returning article 60 to its first position.

In another embodiment, the locking mechanism 2 can be returned to the first position manually after activation of ring 14. The retraction spring 7 reduces the manual forces that are utilized to return the locking mechanism 2 to its first position.

Figure 6:
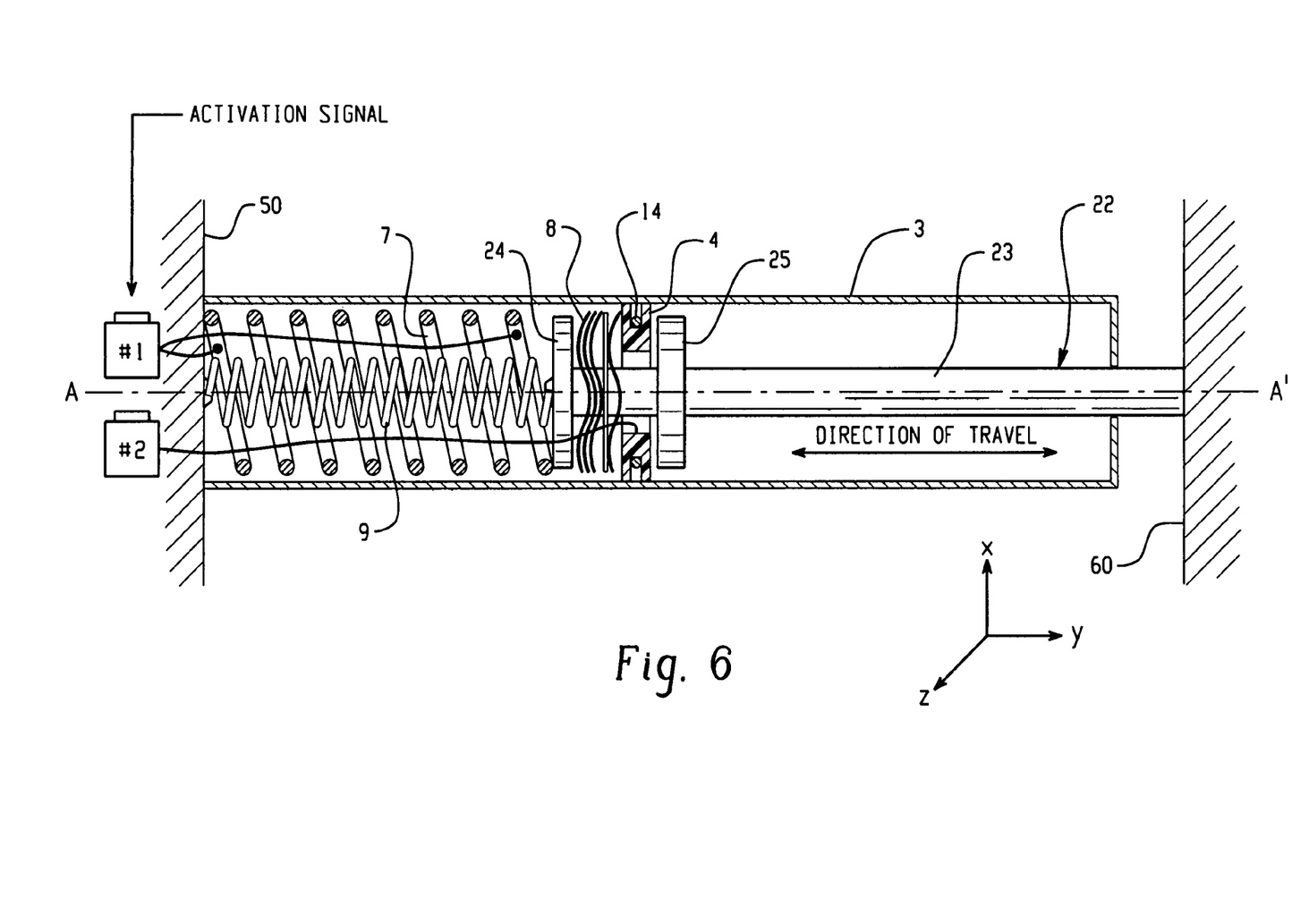
FIG. 6 is a depiction of one exemplary embodiment of a locking mechanism 2 that can be used to resist tensile forces on the locking mechanism 2.

In yet another exemplary embodiment depicted in the FIG. 6, the retraction spring 7 is manufactured from a smart material such as, for example, a shape memory alloy, while the expansion spring 9 is manufactured from a material that does not have memory retention capabilities. All the other components depicted in the FIG. 6 function in the same manner as those in the FIG. 5. The embodiment depicted in the FIG. 6 can be advantageously used to resist tensile loads.

Figure 7:
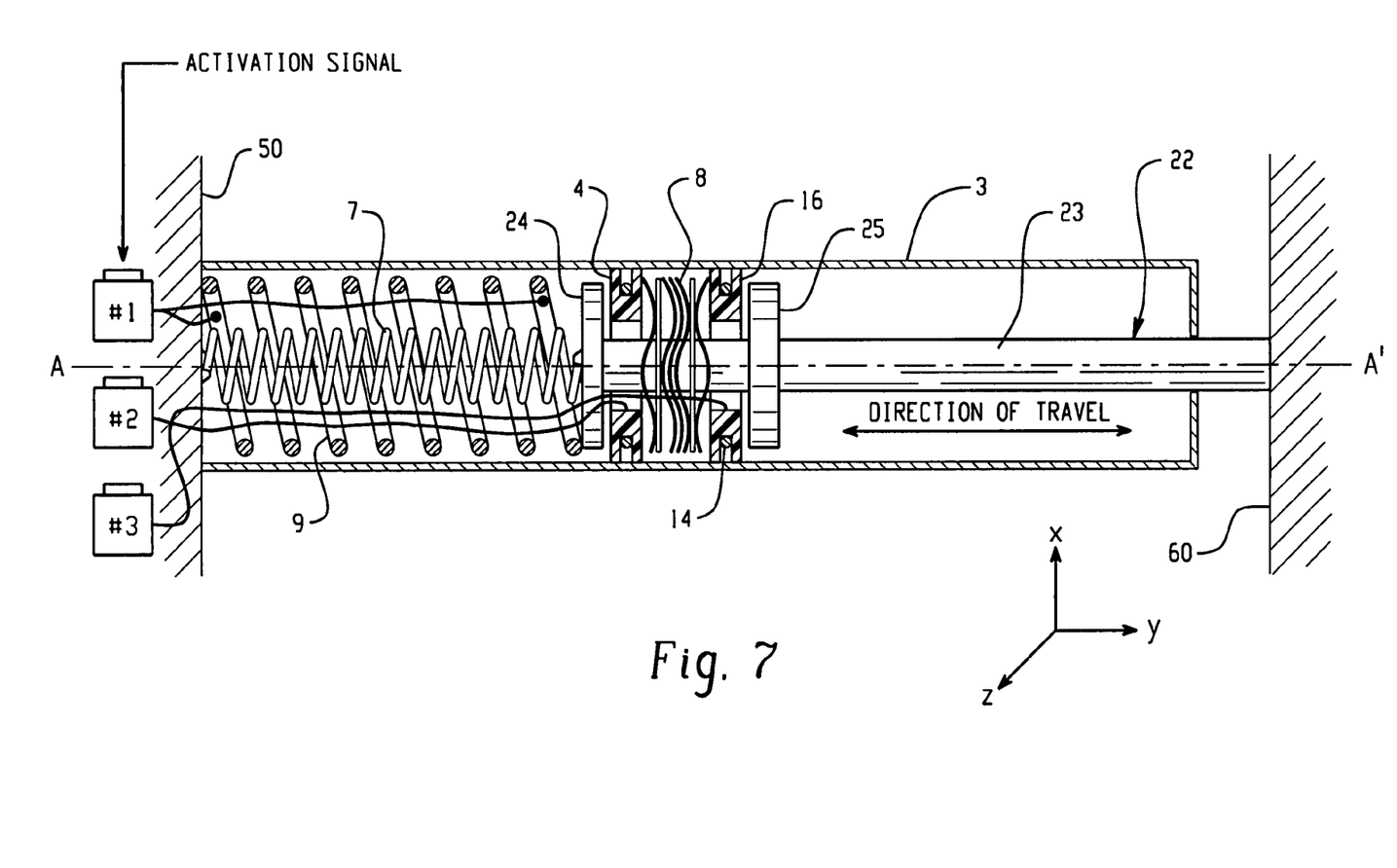
FIG. 7 is a depiction of one exemplary embodiment of a locking mechanism 2 that can be used to resist both tensile forces and compressive forces on the locking mechanism

In yet another embodiment depicted in the FIG. 7, the locking mechanism 2 can resist both compressive and tensile loads. In this embodiment, the locking mechanism comprises two compression initiation elements 4 and 16 disposed on the shaft 22 of the connecting means 23. The compression initiation elements are disposed on opposing sides of the spring stack 8. In one exemplary embodiment, the spring stack 8 comprises wave springs. The spring stack 8 used in this embodiment comprises a dual wave spring stack. As in the embodiments depicted in the FIGS. 5 and 6, the active element 6 comprises a retraction spring 7 and an expansion spring 9. The expansion spring 9 comprises a shape memory alloy that can be activated by the application of heat.

In one embodiment, in one exemplary method of operating the locking mechanism depicted in the FIG. 7, the compression initiation element 16 is first activated. Expansion spring 9 overcomes the force exerted by the non-activated retraction spring 7, thus promoting the extension of the locking mechanism 2 and the displacement of the connecting means 22 towards article 60. After element 14 of the compression initiation element 16 has been deactivated, this mechanism will resist both compressive and tensile forces. In another exemplary method of operating the locking mechanism depicted in the FIG. 7, the compression initiation element 4 is activated while the retraction spring 7 is also activated thereby overcoming the spring constant of the expansion spring 9. This facilitates the contraction of the locking mechanism 2 and the connecting means 22 is displaced towards the reference frame 50.

In one embodiment, by the application of a suitable external stimulus, the locking mechanism 2 may promote a locking of the article 60 in any desired position. The locking of the article is accomplished at an load effective to prevent its being overcome by the use of ordinary manual force, or the weight of the article, or other forces of nature such as a wind, or the like. In one embodiment, it is desirable to accomplish the locking in a manner such that it cannot be overcome by the application of a force of greater than or equal to about 10 kilograms. In another embodiment, the locking is accomplished in a manner such that it cannot be overcome by the application of a force of greater than or equal to about 20 kilograms. In yet another embodiment, the locking is accomplished in a manner such that it cannot be overcome by the application of a force of greater than or equal to about 50 kilograms. In yet another embodiment, the locking is accomplished in a manner such that it cannot be overcome by the application of a force of greater than or equal to about 100 kilograms.

It is desirable to accomplish the positioning or repositioning in a manner such that it can be accomplished by the application of a force of less than or equal to about 10 kilograms. In one embodiment, the positioning or repositioning is accomplished by the application of a force of less than or equal to about 5 kilograms. In one embodiment, the positioning or repositioning is accomplished by the application of a force of less than or equal to about 2 kilograms.

It is desirable for the locking mechanism 2 to be capable of imparting motion to an article 60 having a weight of about 0.5 kilogram (kg) to about 10,000 kilograms. In one embodiment, the locking mechanism 2 can reposition an article a distance of about 1 micrometer to about 10,000 millimeters. In yet another embodiment, the locking mechanism 2 has an accuracy of about 0.05 micrometers to about 50 micrometers from a specified reference point and a resolution of 0.25 millimeter. Further, the locking mechanism 2 is capable of a full range of motion in a time period of about 1 second to about 10 minutes.

The locking mechanism 2 is advantageous in that it permits positioning at any height or degree of opening depending upon the physical characteristics of the person opening the article. The detent capability exhibited by the wave spring locking mechanism may be advantageously employed in automobile lift gates, tail gates, doors, hoods, trunks, or the like. They may also be advantageously employed in windows and doors for aircraft, ships, residential and office buildings. The wave spring locking mechanism may be advantageously employed in storm doors for residential and office buildings.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A locking mechanism for positioning or locking an article comprising:
   a housing;
   an element in operative communication with a connecting means, wherein the active element and the connecting means are disposed within the housing; wherein the element upon being activated is capable of exerting a force on the connecting means, wherein the connecting means is in slidable communication with the housing and comprises a shaft, a first disc and a second disc, wherein the first and second discs are spaced apart and fixedly attached to the shaft;
   a compression initiation element located within the housing and disposed between the first and second discs, wherein the compression initiation element comprises a shape memory material, and wherein the compression initiation element upon activation facilitates the movement of the element; and
   a spring stack disposed between the first and second discs and adjacent to the compression initiation element, wherein the spring stack is in operative communication with the compression initiation element and wherein the spring stack is configured to axially expand within the housing.

2. The locking mechanism of claim 1, wherein the shape memory material comprises a composition that has the ability to remember its original shape upon the application of an activation signal.

3. The locking mechanism of claim 2, wherein the activation signal is a change in temperature.

4. The locking mechanism of claim 1, wherein the stack undergoes radial expansion upon being compressed, and wherein the radial expansion of the spring stack promotes locking of an article that is in operative communication with the locking mechanism.

5. The locking mechanism of claim 1, wherein the housing houses the element, the connecting means, the compression initiation element, and the spring stack and wherein the connecting means is in slideable communication with the housing.

6. The locking mechanism of claim 5, wherein the element, the connecting means, and the spring stack act cooperatively with each other to permit positioning and/or locking of article that is in communication with the locking mechanism.

7. The lacking mechanism of claim 1, wherein the compression initiation element in its original state is in circumferential contact with an inner surface of a housing that houses the compression initiation element, and wherein the compression initiation element in its original shape applies a radial load against the inner surface of the housing.

8. The locking mechanism, of claim 1, wherein the compression initiation element comprises a split ring that comprises a circumferential slot into which is disposed a ring, wherein the ring comprises a shape memory material.

9. The locking mechanism of claim 1, wherein the compression initiation element comprises a circular hoop element, with a cross-member manufactured from a smart material that can contract upon activation and wherein the circular hoop element upon deformation contacts the inner surface of the housing.

10. The locking mechanism of claim 1, further comprising a second compression initiation element disposed between the first cylindrical disc and the second cylindrical disc.

11. The locking mechanism claim 1, wherein the element comprises an expansion spring and/or a retraction spring and wherein the expansion spring and/or the retraction spring comprises a shape memory material.

12. The locking mechanism of claim 1, wherein the locking mechanism is capable of resisting a compressive force and/or a tensile force, 13. The locking mechanism of claim 1, wherein the locking mechanism is capable of infinite detent.

14. A method for operating a locking mechanism comprising:
   activating a compression initiation element that comprises a shape memory material by the application of an external stimulus;
   decompressing a spring stack, wherein the spring stack comprises one or more springs;
   moving an element in a manner effective to displace a connecting means disposed between an article and a reference frame, wherein the compression initiation element, the spring stack and the connecting means at all disposed within a housing, wherein the connecting means is in slidable communication with the housing and comprises a shaft, a first disc and a second disc, wherein the first and second discs are spaced apart and fixedly attached to the shaft, and wherein the compression initiation element and the spring stack are intermediate to the first and second discs.

15. The method of claim 14, wherein the activating of the compression initiation element reduces the radial load and the axial friction between the compression initiation element and the housing as well as between the spring stack and the housing.

16. The method of claim 14, wherein activating the compression initiation element comprises heating the shape memory material above its transition temperature and enabling it to apply a compressive force on the compression initiation element.

17. The method of claim 14, wherein decompressing the spring stack promotes radial contraction of the springs in the stack, and wherein the radial contraction promotes a reduction in the axial friction between the spiring stack and the housing.

18. The method of claim 14, further comprising radially expanding the springs in the spring stack to promote locking of the article with respect to the reference frame.

19. The method of claim 14, wherein moving the element comprises expanding an expansion spring and/or retracting a retraction spring.

* * * * *